Dec. 5, 1939.  H. N. OTT  2,182,499

MEANS FOR IMPROVING THE AVAILABLE RESOLVING POWER OF MICROSCOPES

Filed Dec. 30, 1936

INVENTOR
Harvey N. Ott
by Parker, Prochnow & Farmer
ATTORNEYS

Patented Dec. 5, 1939

2,182,499

UNITED STATES PATENT OFFICE 2,182,499

MEANS FOR IMPROVING THE AVAILABLE RESOLVING POWER OF MICROSCOPES

Harvey N. Ott, Buffalo, N. Y., assignor to Spencer Lens Company, Buffalo, N. Y.

Application December 30, 1936, Serial No. 118,282

5 Claims. (Cl. 88—40)

This invention relates to microscopes and the objects of the invention are to provide means for improving the available resolving power of a microscope; also to provide in a microscope an improved illumination of the object whereby the available resolving power of the instrument is improved.

Another object of this invention is to illuminate the object under observance in a microscope by means of a cone or pencil of light which is of maximum intensity at the peripheral portion of the beam and which has a central portion in which the light is of gradually decreasing intensity toward the axis of the cone or pencil of light.

Another object of the invention is to improve the available resolving power of a microscope by providing a microscope with a substage condenser constructed to concentrate on the object a cone or pencil of light, which is of maximum intensity in the peripheral zone thereof and of gradually reduced intensity in the central zone and of minimum intensity at the optical axis of the microscope.

Further objects of the invention will be apparent from the following description and claims.

Figure 1:
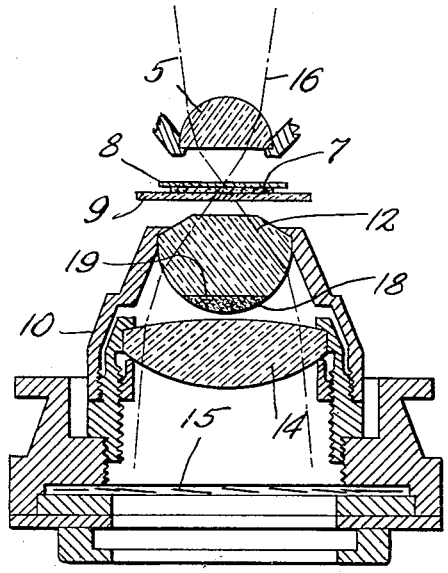
Fig. 1 is a central sectional elevation of a portion of a microscope including the lower portion of the objective and a substage condenser which is shown in section, and in which one embodiment of this invention is illustrated.

The ability of a microscope objective to resolve objects placed under it, so that an object may not only be seen as a whole but so that the component parts of the object may also be clear, depends to a large extent upon the angular aperture or numerical aperture of the objective. Substage condensers have heretofore been made to present to the objective of the microscope a cone of light with a wide angle, the apex of the cone being at the object under observation and the light from the object again diverging to enter the objective at a wide angle. The greater the angle of the cone of light which passes through an object to the objective, the greater the resolving power of the objective, providing that the objective itself is of such numerical aperture as to receive the full cone of light from the condenser and to transmit all portions of light of this cone to the image. Microscope makers have for years striven to make the objective of as high numerical aperture as possible in order to obtain the maximum resolving power.

This increase in the angle of the cone of light results, of course, in an increase in the volume of light, which in most cases is excessive, so that the light passing to the eye is so bright that the object is more or less drowned out by the volume of light. This is particularly true of thin and rather transparent objects whose outlines are finely or dimly defined. Different means have been devised to subdue the intensity of the beam of light entering the condenser and have helped to some extent, but while thus subduing the light, the rays in the peripheral regions of the cone of light made by the condenser have been subdued as well as the central regions. These peripheral rays are the ones which play the most important part in the resolving power of the microscope. Practically all microscopes are, for example, provided below the condenser with an iris diaphragm, the opening through which may be reduced to diminish the intensity of light entering the condenser, but by diminishing the opening of the diaphragm to reduce the amount of light passing to the object, the peripheral rays which form the large angle are particularly reduced, and consequently, the resolving power of the microscope is also reduced.

Means have heretofore been used for completely cutting off the rays in the central zone of the condenser for the purpose of producing dark field illumination. Dark field illuminators in some cases are desirable, but it is hard to manipulate a microscope when using dark field illumination and whereas in some instances such illuminators are desirable, as for example, with very thin and nearly transparent objects, in the majority of instances they are undesirable, because parts only of the object are shown by reflected and scattered light.

I have found that by subduing the intensity of the light reaching the object without reducing the intensity of the light at the peripheral portions of the beam or cone of light passing to the object, a two-fold purpose is accomplished, namely, the avoidance of glare resulting from the transmission of an excessive amount of light to the eye and at the same time a marked improvement in the visible or available resolving power of the instrument. Even under conditions where no glare would be noticeable in microscopes as heretofore made, my invention nevertheless effects a great improvement in the available resolving power of the microscope.

It will be obvious that a reduction of light in the middle portion of the beam passing to the object may be effected in many different ways and the accompanying drawing, consequently, illustrates by way of examples, merely two embodiments of my invention. In Fig. 1, 5 represents the lower end of the objective of a microscope which may be of any suitable or desired construction as heretofore commonly employed, and 7 represents an object or specimen, which in the particular construction illustrated, is mounted on a slide of the usual kind comprising two glass plates 8 and 9, the object being arranged between the two plates.

The condenser may be of any suitable or desired form and includes a suitable housing 10 which may comprise a plurality of parts suitably secured together to support a condensing lens or lenses, two such lenses 12 and 14 being shown in the construction illustrated. In the housing an iris diaphragm or other device for controlling the amount of light passing through the condenser, may be suitably mounted if desired, this iris diaphragm being shown conventionally in the drawing at 15. In a condenser of this kind, light passing upwardly into the same is converged by the lens or lenses into a cone or pencil, the apex of which is at the object 7, the refraction of the light being illustrated by the line 16. The light rays after passing through the object diverge upwardly and pass into the objective lens, the aperture of which is of sufficient size to admit all or substantially all of the light which is thus passed through the object.

The condenser may be provided with any suitable or desired means for reducing the amount of light which passes through the middle portion thereof to the object and obviously this can be accomplished by a variety of different means, and such means may be applied directly to one or more of the lenses of the condenser or these means may be separate from the lenses themselves. It is also possible to make one or more lenses of the condenser of a composite construction, so that the middle portion of a lens may be of a material which restricts or modifies the passage of light therethrough. In the particular construction illustrated, the upper lens 12 is of this latter type and has a light modifying portion or lens applied to the lower part thereof. The upper lens in the particular construction shown has a light intensity reducing member or lens 18 applied thereto and substantially forming a part thereof. This member 18 may be made of a light absorbing or retarding substance of any suitable or desired kind capable of modifying the intensity of the central rays of the beam or cone of light and may be made of colored or translucent glass or of any other material. The light modifying member 18 in the construction shown is securely cemented to the lens 12, thus forming the two parts 12 and 18 into an integral unit, and the outer surface of this member may have the same contour that the lens 12 would ordinarily have had if this member had not been applied thereto. The seam or surface 19 at which the body 18 and the lens 12 contact may be of any suitable form, being in the form of a plane surface in the construction illustrated. Obviously, however, this surface 19 may be formed on a radius greater than that of the convex surface of the lens 12, or the lens 12 may be provided with a concave surface into which a corresponding convex surface of the body 18 fits. Since the amount of light which passes through a colored or translucent body varies in accordance with the thickness of the body, it will be noted that by means of a light retarding body having the thickest portion in the middle of the light beam or pencil and which gradually becomes less thick toward its edges, there will be gradual decrease in the amount of light passing through the body 18 from the edges thereof toward the middle, so that there will be no sharp line of demarcation or shadow formed on the image by the edges of the body 18. This gradual variation in the amount of light transmitted through the intensity modifying member 18, so that less light passes through the middle portion of the member than through the edge portions, also further increases the resolving power of the optical instrument.

In place of incorporating the intensity modifying member 18 as a part of the lens as shown in the drawing, it will be obvious that a separate plate may be positioned in the condenser, and which may be provided with a deposit or coating thereon for reducing the amount of light passing through the middle portion of the condenser may be used, or if desired, a suitable coating or deposit may be formed on one or more of the lenses of the condenser.

Figure 2:
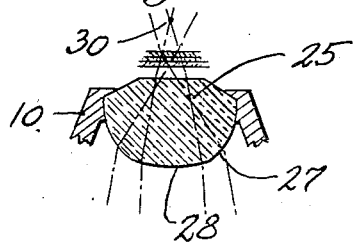
Fig. 2 is a fragmentary central sectional elevation of a lens of modified construction for use in the substage condenser.

In Fig. 2 is illustrated a modified form of upper lens for the substage condenser. This lens 25 has the lower surface thereof so formed that light passing through the peripheral zone or portions 27 thereof will converge at a focal point in the plane of the object. The middle portion 28 of the lower face of this lens is of different curvature, so that light passing through the middle portion will not be concentrated on the part of the object which is under observation. In the lens shown in Fig. 2, for example, this is accomplished by forming the middle portion of the lens of such curvature that the light will be concentrated at a point located well above the object, for example, the point 30. This lens will, consequently, produce results very similar to those produced by the construction shown in Fig. 1, in that only a small quantity of light from the middle or axial portion of the illuminator will strike the part of the object which is under observation, while light from the peripheral portions of the illuminator will be concentrated on that part of the object. The lens 25 may, furthermore, be useful for illuminating an object which may be located at the focal point 30, in case it is desired to project light on such object in a more nearly vertical direction.

The invention herein described affects a remarkable and unexpected improvement in the available resolving power of a microscope under any conditions of use of the same and incidentally also prevents glare, if the object under observation is one that would permit an excessive amount of light to pass through the same.

I claim as my invention:

1. A microscope condenser having a lens provided with a body portion of clear transparent glass, and a minor central portion of said lens at one face thereof formed of a glass which obstructs the passage of part of the rays entering said portion and which is of greatest thickness in the middle portion thereof which is coincident with the optical axis of said lens and which gradually decreases toward the edge of said portion, said minor portion being of materially smaller diameter than said body portion, said body and minor portions being secured together and formed into a single lens element shaped to converge a beam of light to the focal point of the lens, the parts of said body portion located beyond the periphery of said minor portion providing a substantially unrestricted path for the light rays entering the same and said minor portion of said lens restricting the passage of the light rays to a gradually increasing extent from the periphery thereof to the axial portion thereof, whereby the available resolving power of a microscope is improved.

2. The combination in a microscope having an objective, and means for directing a beam of light toward the objective in the general direction of the optical axis of the microscope, of means for improving the available resolving power of the microscope including a condenser having a lens arranged in said beam and interposed between said light directing means and said objective, said lens having a clear peripheral zone thereof formed to concentrate light of said beam substantially without obstruction to a focal point which coincides with an object to be illuminated, said condenser lens also having disposed in the axial zone of said beam of light an integral central section formed of a material which reduces the intensity of light passing therethrough to the object and which is also shaped to concentrate any light passing therethrough to said focal point, said section having its greatest light reducing effect at the axis of said beam and progressively decreasing in its light intensity reducing effect to the peripheral portion of said section.

3. A lens for a microscope condenser for improving the available resolving power of the microscope, said lens including a major body portion of transparent glass through which rays from a source of light may pass without loss of intensity of the light beam and a minor portion secured to said body portion at and concentrically about the optical axis of said lens, said minor portion being formed of material such that it acts to obstruct passage of a portion of the light rays entering the same, the exposed face of said minor portion and the contiguous surface of said major portion together forming a substantially spherical face so that light rays from said source entering said face and passing through said lens will converge in a single focal point, and whereby by reason of the obstruction of some of the rays entering said minor portion a reduction of intensity of the light passing through the central portion of said lens to said focus will be secured.

4. A lens for a microscope condenser for improving the available resolving power of the microscope, said lens including a major body portion of transparent glass through which rays from a source of light may pass without loss of intensity of the light beam, and a minor portion secured to a face of said body portion at and concentrically about the optical axis of said lens and which minor portion is of such shape as to gradually diminish in thickness from the axial portion thereof, which is of a major thickness to the periphery thereof which is a thin edge, said minor portion being formed of material such that it acts to obstruct passage of a portion of the light rays entering the same, the exposed face of said minor portion and the contiguous surface of said major portion together forming a substantially spherical face so that light rays from said source entering said face and passing through said lens will converge in a single focal point, and whereby, by reason of the obstruction of some of the rays entering said minor portion a reduction of intensity of the light passing through the central portion of said lens to said focus will be secured, the reduction in intensity being greatest at the part of maximum thickness and of least reduction at the peripheral part of said minor lens portion.

5. In a microscope having an objective, a light source for directing a beam of light toward said objective generally along the axis thereof, and a unitary condenser lens element disposed in said beam between said light source and said objective, said lens having an annular peripheral portion of clear glass formed to converge rays of said light beam passing therethrough substantially without loss of intensity to an object disposed beneath said objective and in the focus of said condenser lens, and said lens element also having a central glass portion disposed within said peripheral portion upon and about the axis of said lens and which has incorporated therewith an obstructing medium by which that portion of said light beam which enters said central lens portion is reduced in intensity before reaching said object, whereby the available resolving power of the microscope is improved.

HARVEY N. OTT.